United States Patent [19]
Hiji et al.

[11] Patent Number: 5,504,840
[45] Date of Patent: Apr. 2, 1996

[54] KNOWLEDGE ACQUISITION SUPPORT SYSTEM AND METHOD IN AN EXPERT SYSTEM

[75] Inventors: Masahiro Hiji, Sendai; Toshiro Yamanaka, Machida, both of Japan

[73] Assignees: Hitachi, Ltd., Tokyo; Hitachi Touhoku Software, Ltd., Miyagi, both of Japan

[21] Appl. No.: 901,576

[22] Filed: Jun. 19, 1992

[30] Foreign Application Priority Data

Jun. 20, 1991 [JP] Japan .................................. 3-148421

[51] Int. Cl.⁶ .................................................. G06F 15/18
[52] U.S. Cl. .............................. 395/77; 395/50; 395/54; 395/75
[58] Field of Search ........................... 395/77, 906, 908, 395/54, 911, 61–62, 10–11, 50–52, 75

[56] References Cited

U.S. PATENT DOCUMENTS

| | | | |
|---|---|---|---|
| 4,713,775 | 12/1987 | Scott et al. | 395/50 |
| 4,847,784 | 7/1989 | Clancey | 395/54 |
| 4,853,873 | 8/1989 | Tsuji et al. | 395/77 |
| 4,935,876 | 6/1990 | Hanatsuka | 395/51 |
| 4,972,328 | 11/1990 | Wu et al. | 395/62 |
| 4,985,824 | 1/1991 | Husseiny et al. | 395/11 |
| 5,043,915 | 8/1991 | Suwa et al. | 395/52 |
| 5,119,318 | 6/1992 | Paradies et al. | 395/61 |
| 5,121,467 | 6/1992 | Skeirik | 395/906 |
| 5,159,685 | 10/1992 | Kung | 395/908 |
| 5,179,633 | 1/1993 | Barabash et al. | 395/906 |
| 5,222,197 | 6/1993 | Teng et al. | 395/68 |
| 5,224,204 | 6/1993 | Tsuruta et al. | 395/51 |
| 5,239,547 | 8/1993 | Tomiyama et al. | 395/911 |

OTHER PUBLICATIONS

Mathis et al, "A software development environment to generate external interfaces for microcomputer–based expert systems"; IEEE conference on managing expert system programs and projects, pp. 193–200, 10–12 Sep. 1990.

Yamamoto et al, "Multiobjective evaluation expert system by hypothetical reasoning and case–based reasoning"; 1991 International conference on industrial electronics, pp. 1611–1616 vol. 2, 28 Oct.–1 Nov. 1991.

Okamura et al, "Development of automatic knowledge–acquisition expert system"; 1991 International conference on industrial electronics, pp. 37–41 vol. 1, 28 Oct.–1 Nov. 1991.

Quinlan, "Knowledge acquisition from structured data: using determinate literals to assist search"; IEEE Expert, vol. 6, iss. 6, pp. 32–37, Dec. 1991.

Durkin, "Induction . . . via ID3"; AI Expert, vol. 7, No. 4, pp. 48–53, Apr. 1992.

Kevin A. Soulsbury et al, "A Rules–Based Approach to Clasification of Chemical Acoustic Emission Signals," Chemometrics and Intelligent Laboratory Systems, vol. 15, No. 5, Mar. 1991, Amsterdam, Netherlands, pp. 87–105.

Angelo Bravos, "The Use of Entitly–Relationship Models to Build Expert Systems," Proceedings of the National Communications Forum, vol. XXXXI, No. II, 1987, Oak Brook, Illinois, pp. 1237–1241.

Sholom M. Weiss et al, "Maximizing the Predictive Value of Production Rules," Artificial Intelligence, vol. 45, No. 1/2, Sep. 1990, Amsterdam, Netherlands, pp. 47–71.

Ultsch et al, "CONKAT: A Connectionist Knowledge Acquisition Tool", Proceedings of the 24th annual Int. Conf. on System Sciences, 8–11 Jan. 1991, pp. 507–513 vol. 1.

(List continued on next page.)

*Primary Examiner*—Robert W. Downs
*Assistant Examiner*—Tariq Rafiq Hafiz
*Attorney, Agent, or Firm*—Fay, Sharpe, Beall, Fagan, Minnich & McKee

[57] ABSTRACT

Disclosed in this invention is a knowledge acquisition tool for facilitating a construction of a knowledge base in an expert system, including: a case preprocessing part 21 for checking whether or not data constituting individual cases on which a knowledge base is based satisfy a predetermined evaluation criterion and deleting or changing non-satisfying cases; a rule generation part 22 for generating rules by extracting regularities from the cases processed by preprocessing part 21; and a rule evaluation part 32 for evaluating the rules generated by the rule generation part 22.

3 Claims, 13 Drawing Sheets

OTHER PUBLICATIONS

Kim et al, "Case Supported Expert System for Brief Therapy", 1990 IEEE Conf. on Systems, Man and Cybernetics Conf. Proceedings, 4–7 Nov. 1990, pp. 797–799.

Whitaker et al, "Aerospace Applications of Case–Based Reasoning", Proceedings of the IEEE 1990 National Aerospace and Electronics Conference, 21–25 May 1990, pp. 1113–1116 vol. 3.

Christie et al, "CQR: A Hybrid Expert System for Security Assessment", Conference Papers 1989 Power Industry Computer Applications Conference, 1–5 May 1989, pp. 267–273.

| | ITEM (1) | ITEM (2) | ....... | ITEM (n) | CON-CLUSION | |
|---|---|---|---|---|---|---|
| 331 | VALUE 11 | VALUE 12 | 332  333 | VALUE 1n | CON-CLUSION 1 | 334  33 |
| 341 | VALUE 21 | VALUE 22 | 342  343 | VALUE 2n | CON-CLUSION 1 | 334  34 |
| 351 | VALUE 31 | BLANK | 352  353 | VALUE 3n | CON-CLUSION 3 | 354  35 |
| 341 | VALUE 21 | VALUE 42 | 362  363 | VALUE 4n | CON-CLUSION 4 | 364  36 |
| 371 | VALUE 51 | VALUE 52 | 372  373 | VALUE 5n | CON-CLUSION 5 | 374  37 |
| | ⋮ | ⋮ | | ⋮ | ⋮ | |

Columns 311, 312, 313 form group 31. Column 32 is the conclusion column.

| IF | THEN | RULE NO. |
|---|---|---|
| IF ITEM (2) HAS NO VALUE | EXECUTE THE RULE OF TABLE C | 51 |

FIG. 6

RULE GROUP OF TABLE A  605

| IF | THEN | RULE NO. |
|---|---|---|
| IF ITEM (1) HAS VALUE 11, OR IF ITEM (1) HAS VALUE 21, | THE CONCLUSION IS CONCLUSION 1 | 66 |
| IF ITEM (1) HAS VALUE 11, | THE CONCLUSION IS CONCLUSION 1 | 67 |
| IF ITEM (2) HAS VALUE 22, | THE CONCLUSION IS CONCLUSION 1 | 68 |
| IF ITEM (2) HAS VALUE 42, | THE CONCLUSION IS CONCLUSION 4 | 69 |
| IF ITEM (1) HAS VALUE 51, | THE CONCLUSION IS CONCLUSION 5 | 60 |

RULE GROUP OF TABLE C  606

| IF | THEN | RULE NO. |
|---|---|---|
| OMITTED | OMITTED | |

EVALUATED RESULT TABLE 81

DEFICIENT CASE TABLE 82

| ITEM | VALUE |
|---|---|
| ITEM (1) | VALUE 1000 |
| ⋮ | ⋮ |

ITEM NUMBER TABLE 83

| ITEM | USING NUMBER |
|---|---|
| ITEM (1) | 1 |
| ITEM (2) | 0 |
| ⋮ | ⋮ |

CORRECT CASE TABLE 84

| ITEM (1) | ITEM (2) | ...... | ITEM (n) | CONCLUSION |
|---|---|---|---|---|
| VALUE 11 | VALUE 12 | ...... | VALUE 1n | CONCLUSION 1 |
| ⋮ | ⋮ | | ⋮ | ⋮ |

ERROR CASE TABLE 85

| ITEM (1) | ITEM (2) | | ITEM (n) | CONCLUSION |
|---|---|---|---|---|
| VALUE 51 | VALUE 52 | | VALUE 5n | CONCLUSION 5 |
| ⋮ | ⋮ | | ⋮ | ⋮ |

IMPROPER CONDITION RULE TABLE 86

| CONDITION | CONCLUSION |
|---|---|
| ITEM (2) HAS VALUE 21 AND ITEM (n) HAS VALUE n | CONCLUSION 6 |
| ⋮ | |

IMPROPER CONCLUSION RULE TABLE 87

| CONDITION | CONCLUSION |
|---|---|
| ITEM (1) HAS VALUE 18 | CONCLUSION 7 CONCLUSION 8 |
| ⋮ | ⋮ |

INQUIRY CASE TABLE 94, 983, 97

| ITEM (1) | ITEM (2) | .... | ITEM (n) | ITEM (n+1) | CON-CLUSION |
|---|---|---|---|---|---|
| VALUE 11 | BLANK | .... | BLANK | BLANK | BLANK |
| ⋮ | ⋮ | | ⋮ | ⋮ | ⋮ |
| BLANK | VALUE 21 | .... | VALUE n1 | BLANK | CON-CLUSION 6 |
| ⋮ | ⋮ | | ⋮ | ⋮ | ⋮ |

971

INQUIRY ITEM TABLE 983, 984, 98, 972

| ITEM (1) | ITEM (2) | .... | ITEM (n) | ITEM (n+1) | CON-CLUSION |
|---|---|---|---|---|---|
| VALUE 18 | VALUE 28 | .... | VALUE n8 | VALUE n+17 | CON-CLUSION 7 |
| VALUE 18 | VALUE 28 | .... | VALUE n8 | VALUE n+18 | CON-CLUSION 8 |
| ⋮ | ⋮ | | ⋮ | ⋮ | ⋮ |

TEST CASE TABLE 1050

| ITEM (1) | ITEM (2) | ...... | ITEM (n) | CONCLUSION |
|---|---|---|---|---|
| VALUE 11 | VALUE 12 | ...... | ITEM 1n | CONCLUSION 1 |
| ⋮ | ⋮ | | ⋮ | ⋮ |

KNOWLEDGE ACQUISITION SUPPORT SYSTEM AND METHOD IN AN EXPERT SYSTEM

BACKGROUND OF THE INVENTION

Field of the Invention

The present invention relates generally to a construction of a knowledge base in an expert system and, more particularly, to a knowledge acquisition support system and method for supporting the operation to generate rules exhibiting high usability with high efficiency from a set of plural cases accumulated.

A knowledge acquisition technique for generating rules of an expert system from the accumulated cases is introduced in a paper titled "Utilized Rule Induction for Extracting Knowledge from Cases and Prospective Other Methods", pp.46–55, Spring Issue, Nikkei AI, separate Vol., 1990. With the advancement of utilization of expert systems, it is desired to establish a methodology of acquiring the knowledge and reducing a load of the knowledge acquisition for constructing the knowledge base, which is a key for making the expert system construction successful or unsuccessful.

In general, the knowledge acquisition in the expert system involves, it is said, the following five steps classified roughly.

Step 1: Collecting concrete cases and processing procedures from knowledge sources (documents, human experts, etc).

Step 2: Rearranging the collected cases and processing procedures.

Step 3: Generalizing and regularizing the rearranged cases and processing procedures.

Step 4: Verifying, adding and modifying the generalized and regularized knowledge.

Step 5: Transforming the knowledge of Step 4 into knowledge expressions such as rules and frame and storing them in a knowledge base.

A rule induction technique known as one of the knowledge acquisition techniques which are now at the stage of utilization is capable of supporting a range of Steps 2–5. As a matter of fact, however, the knowledge engineers and human experts having high-level knowledge still perform important operations to construct the knowledge base of the expert system such as rearranging the cases for use, evaluating the generated rules and determining the information to be acquired next.

SUMMARY OF THE INVENTION

It is a primary object of the present invention to facilitate the construction of a knowledge base in an expert system by semi-automatically choosing useful cases used for generating rules and further indicating information to be acquired next on the basis of evaluated results.

To accomplish this object, the operations executed by knowledge engineers and human experts are semi-automated by use of a knowledge acquisition technique comprising the steps of: setting a certain case evaluation criterion for inputted cases; judging whether or not the inputted cases satisfy the evaluation criterion by using the set evaluation criterion; deleting and modifying the non-satisfying cases; generating the rules by using the cases which satisfy the evaluation criterion and relational information between items constituting the previously inputted cases; evaluating the generated rules in a rule evaluation part; judging the evaluated results obtained in the rule evaluation part in accordance with a judging procedure previously accumulated in an information indication part; and indicating a process to be executed next, information to be acquired and information for compensating the inter-item relations.

According to the present invention, when constructing the knowledge base of the expert system, if a set of cases previously accumulated are inputted, the respective cases are evaluated based on the preset criterion. The cases which do not satisfy the evaluation criterion are deleted or modified to satisfy the evaluation criterion. Only the cases which satisfy the evaluation criterion are used for the rule generation. When generating the rules, the conditions for classifying the cases are generated as rules by employing the cases which satisfy the evaluation criterion and the relations between the items constituting the cases. The generated rules are evaluated. A judgment is made about which process to perform in accordance with the previously accumulated judging procedure in association with the evaluated results. Indicated sequentially are pieces of information about the process to be executed next, the cases considered to be deficient and the inter-item relations. These steps are repeatedly effected, thereby making it possible to semi-automatically construct the knowledge base in an expert system.

BRIEF DESCRIPTION OF THE DRAWINGS

Other objects and advantages of the present invention will become apparent during the following discussion taken in conjunction with the accompanying drawings, in which.

DETAILED DESCRIPTION OF THE PREFERRED EMBODIMENT

One preferred embodiment of the present invention will hereinafter be described with reference to the drawings.

Figure 1:
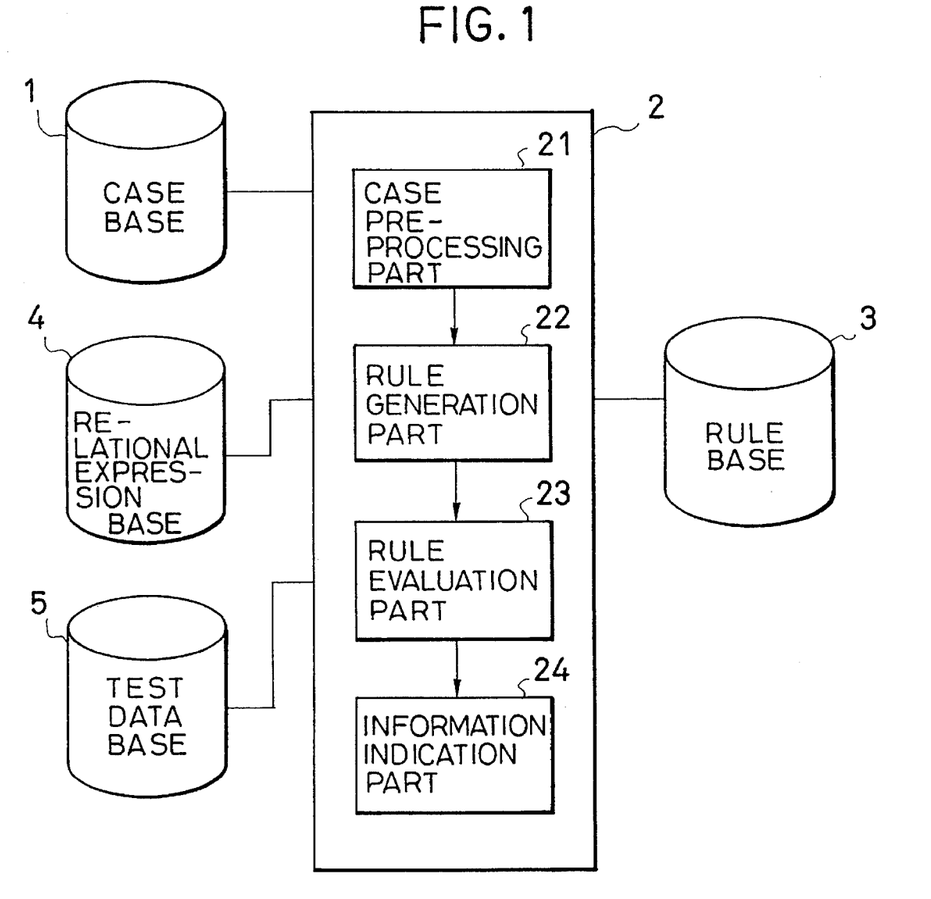
FIG. 1 is a conceptual diagram illustrating a construction of the principal portion of an embodiment of the present invention.
Figure 2:
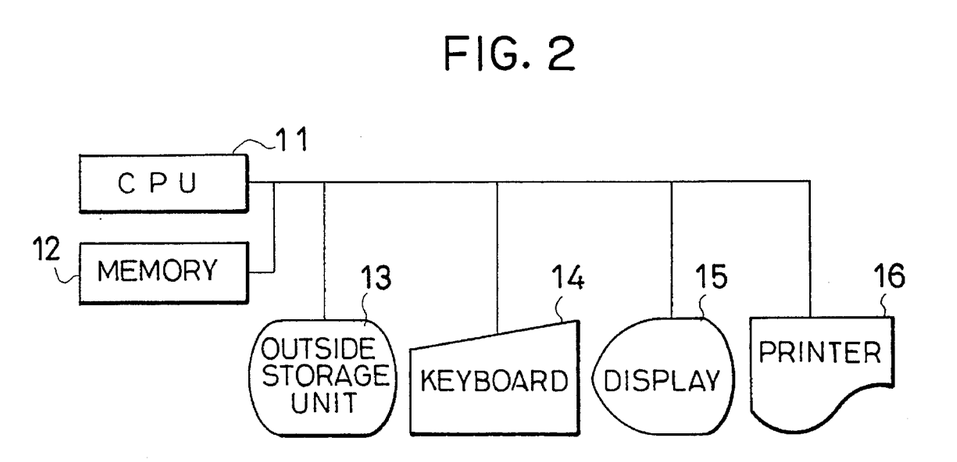
FIG. 2 is a block diagram showing a constructive example of a computer system to which the present invention is applied.

FIG. 1 illustrates a construction of the principal portion in the embodiment of this invention. An illustrated knowledge acquisition support system is constructed of: a case base 1 for accumulating cases; a knowledge acquisition module 2 disposed connectively to the case base 1; a rule base 3 disposed connectively to the knowledge acquisition support module 2; a relational expression base 4, disposed likewise connectively to the knowledge acquisition support module 2, for storing inter-item relational expressions; and a test data base 5, disposed likewise connectively to the knowledge acquisition support module 2, for storing test data. The knowledge acquisition support module 2 consists of a case preprocessing part 21, a rule generation part 22 for generating rules by use of the cases preprocessed by the case preprocessing part 21, a rule evaluation part 23 for evaluating the rules generated by the rule generation part 22 and an information indication part 24. The test data stored in the test data base 5 are used in the rule evaluation part when evaluating the rules. FIG. 2 illustrates a constructive example of hardware of a computer system to which the present invention is applied. The computer system is composed of a CPU 11, a memory 12 connected via a transmission line to the CPU 11, an outside storage unit 13, a keyboard 14, a display 15 and a printer 16. The outside storage unit 13 includes the case base 1, the rule base 3, the relational expression base 4, the test data base 5 which are all shown in FIG. 1 and a judging procedure storage part 91 which will be mentioned latter. The memory 12 includes the knowledge acquisition support module 2.

Figure 3:
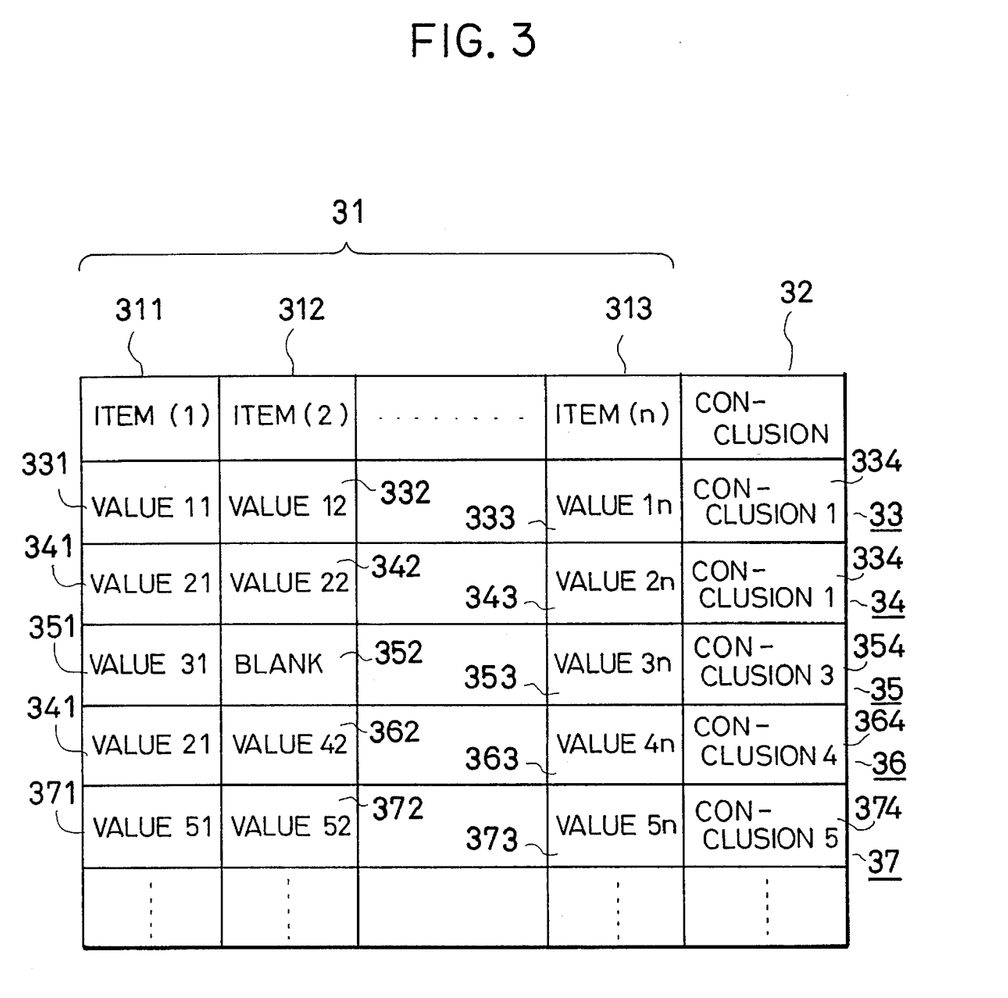
FIG. 3 is a chart showing a construction of a case base in the embodiment of the present invention.

The case base 1 is, as illustrated in FIG. 3, composed of an item 31 which characterizes the case and a conclusion 32 determined by the item 31. The item 31 is capable of designating an arbitrary number of items such as item 311, item 312, . . . , item 313. The item 31 has arbitrary values 331, 332, . . . , 333 for every item. The conclusion 32 has a value 334 determined by the above-described arbitrary values 331, 332, . . . , 333 for every item. A string of values arranged horizontally in FIG. 3, i.e., 331, 332, . . . , 333, 334, correspond to one case 33. Among the cases stored in the case base 1, as in the instance of a blank 352 of the case 35, some have no value (blank) with respect to a certain item. The items 311, 312, . . . in accordance with this embodiment are provided on the assumption of specific status quantities of temperature, pressure and the like at a certain detection point of the process. Hence, having no value with respect to a certain item implies that, for example, a pressure value at a certain detection point is not designated.

Figure 4:
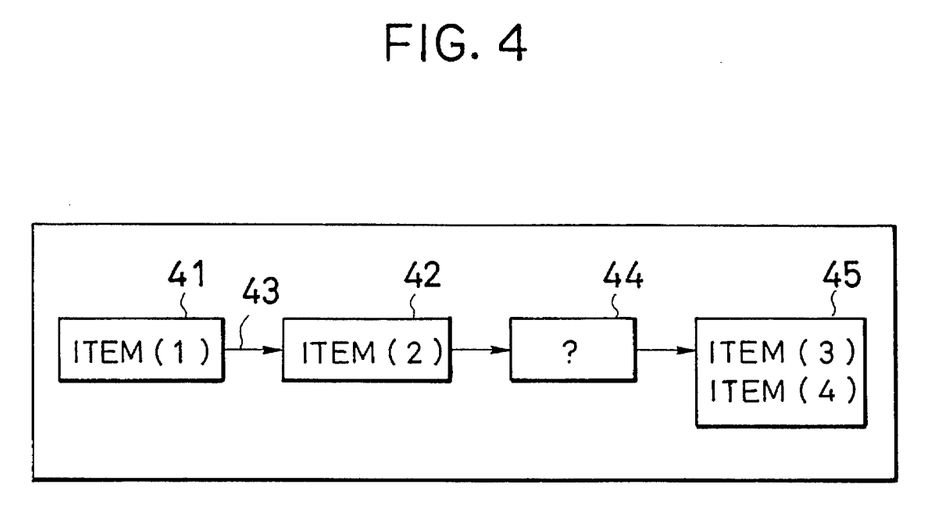
FIG. 4 is a relational diagram showing a relation between items constituting a condition part.

FIG. 4 shows an example of the relational expressions indicating the order according to a magnitude of importance between the items (item 311, item 312, . . . , item 313 in FIG. 3). In the relational expression, as depicted in FIG. 4, the items 41, 42, . . . are well arranged from left to right in the order according to the magnitude of importance and are connected through arrowed lines 43. A portion in which the importance is not defined is indicated by "?" as shown in the item 44. A plurality of items which are equally dealt with are put en bloc into a single box 45. This relational expression inputted from the keyboard 14 is stored in the relational expression base 4.

Figure 5:
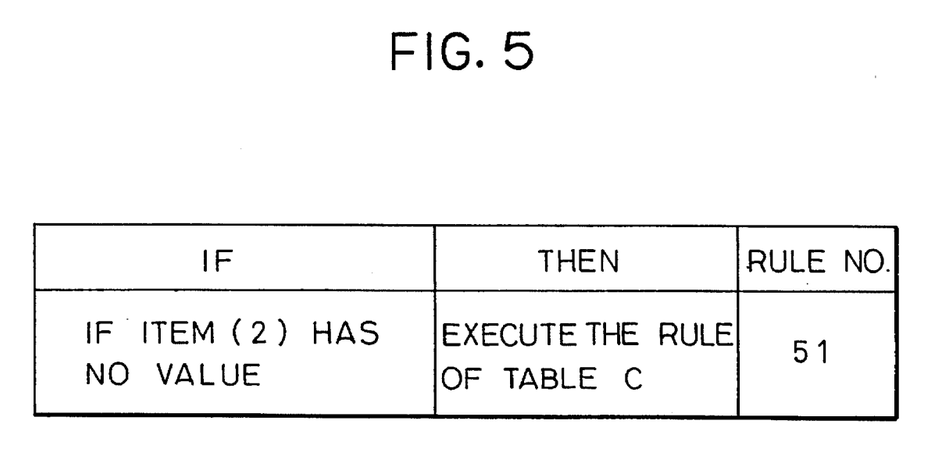
FIG. 5 is a chart illustrating an example of rules generated by a case preprocessing part 21.

FIG. 5 shows one example of rule generated by the case preprocessing part 21. If the case to be judged has no value of the item (2), it is prescribed from the cases stored in a table C that the rule generated by the rule generation part 22 is to be executed. The table C will hereinafter be explained.

Figure 6:
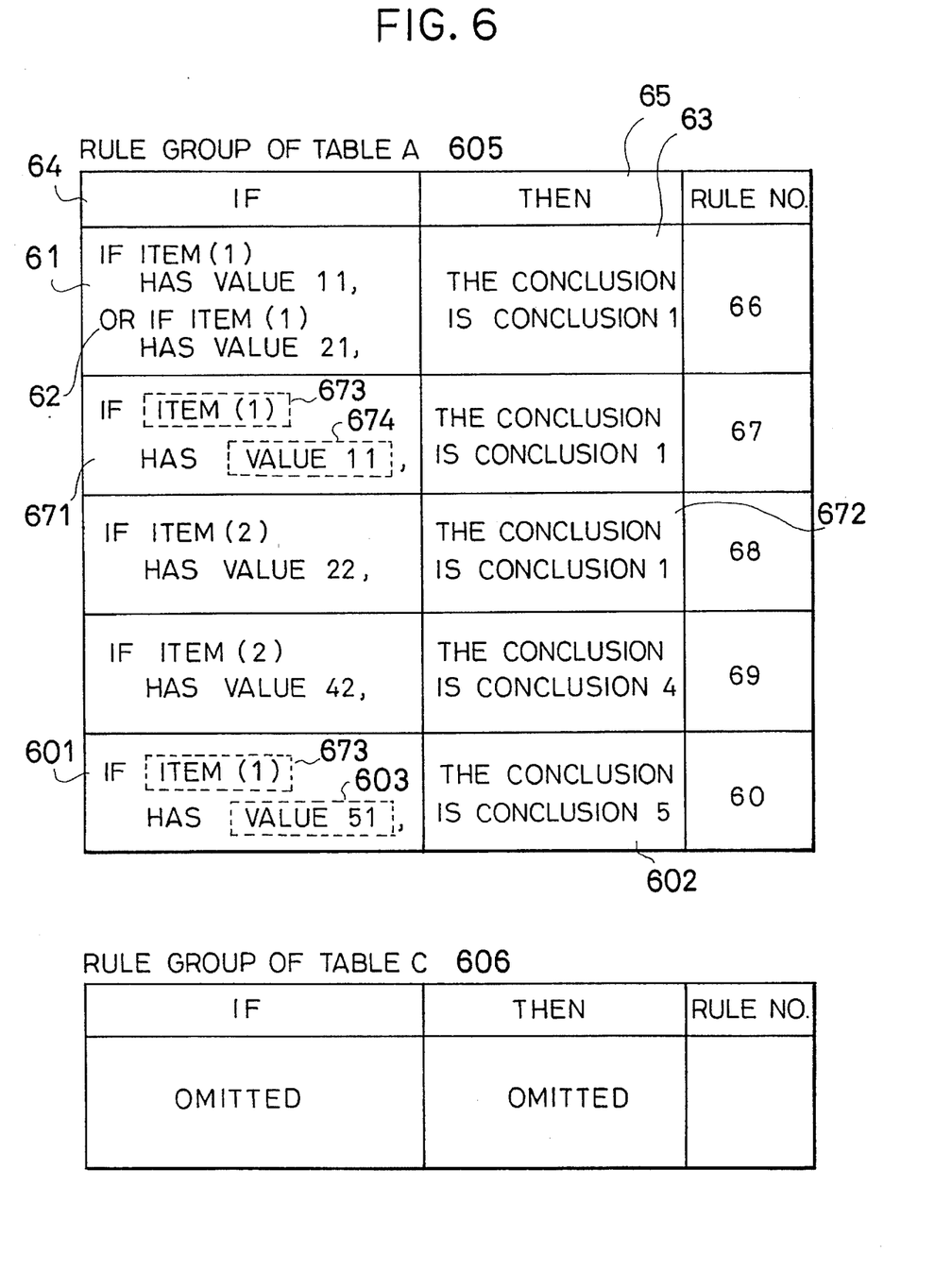
FIG. 6 is a chart showing an example of rules generated by a rule generation part 22.

FIG. 6 shows one example of rules generated by the rule generation part 22. For instance, a rule 66 consists of conditions 61, 62 and a value 63 of the conclusion determined when satisfying the condition 61 or 62. A set of the conditions 61, 62 in the rule 66 is referred to as a condition part 64. If there are one or more values 63 of the conclusions, a set of these values is called a conclusion part 65. The notations of rules 67, 68, 69 and 60 are the same.

Figure 7:
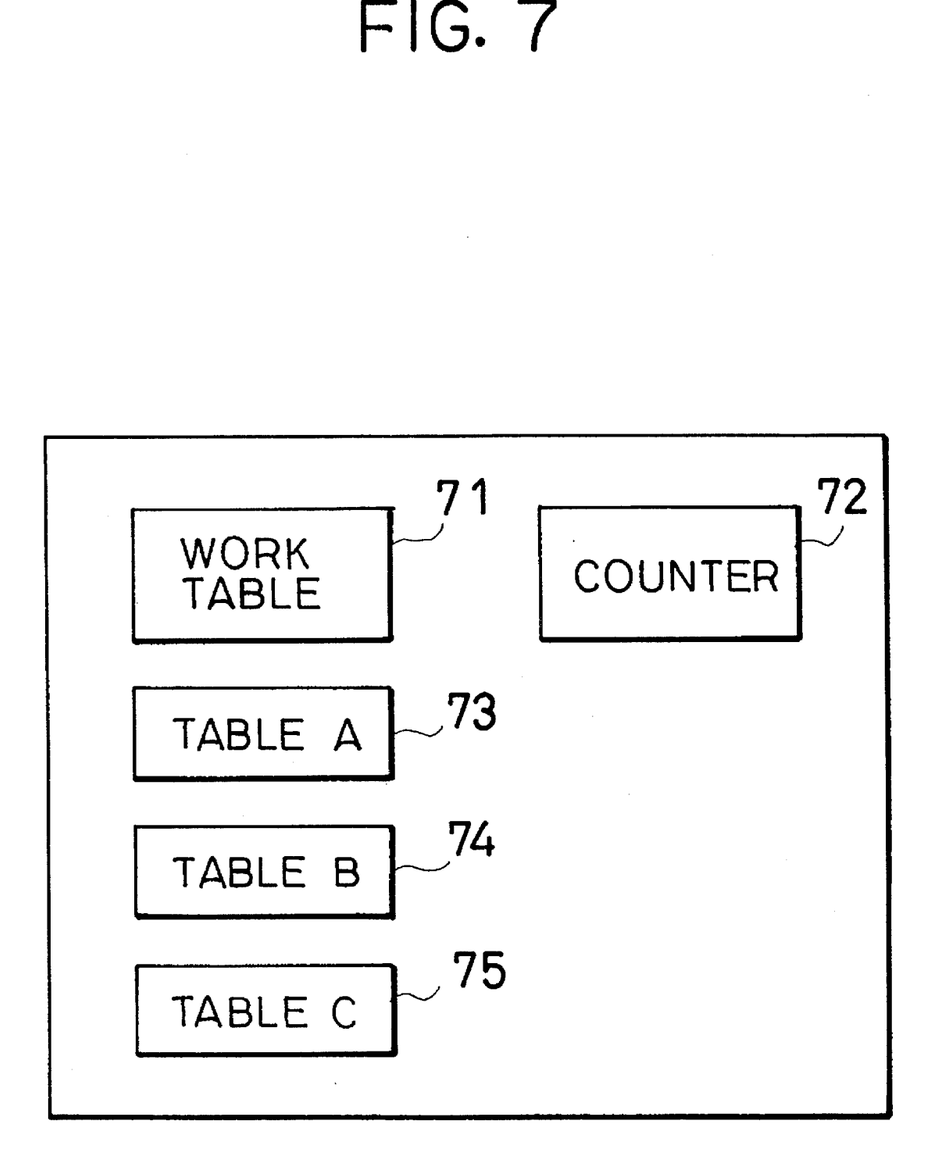
FIG. 7 is a chart depicting a counter and tables prepared by the case preprocessing part 21.

FIG. 7 illustrates a data construction of tables prepared by the case preprocessing part 21. Based on the read cases, the case preprocessing part 21 prepares a work table 71 for storing the cases per conclusion, a counter 72 for counting the number of cases per conclusion, a table A 73 for storing the cases which satisfy an evaluation criterion, a table B 74 for storing the cases of the conclusions having a fewer number of cases than a given constant number and a table C 75 for storing a case 35 having no value with respect to a certain item 312. The table C 75 is prepared only when there is a necessity for storing the case having no value with respect to a certain item.

Figure 8:
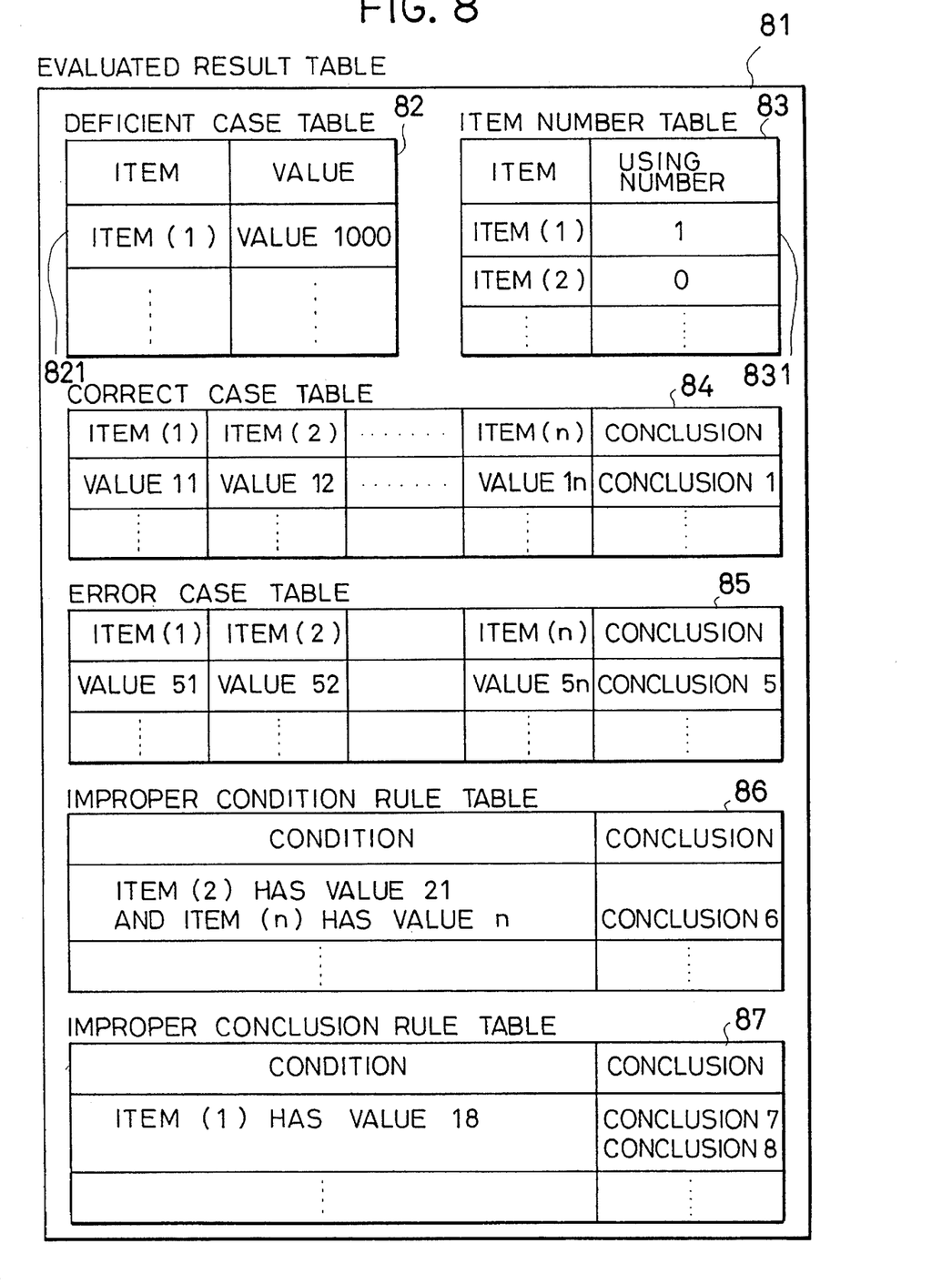
FIG. 8 is a chart illustrating a construction of the table prepared by a rule evaluation part 23.

FIG. 8 illustrates a data construction of tables prepared by the rule evaluation part 23. The rule evaluation part 23 for evaluating the generated rules prepares a deficient case table 82 for storing the cases considered to be deficient, an item number table 83 for storing the data indicating a using number of each item of the rule condition part, a correct case table 84 for storing the cases correctly classified by the generated rules, an error case table 85 for storing the cases incorrectly classified by the generated rules, an improper condition rule table 86 for storing the rules in which the number of conditions of the condition part is more than a constant value previously inputted and an improper conclusion rule table 87 for storing the rules in which the number of conclusions of the conclusion part is more than a previously inputted constant value.

Figure 9:
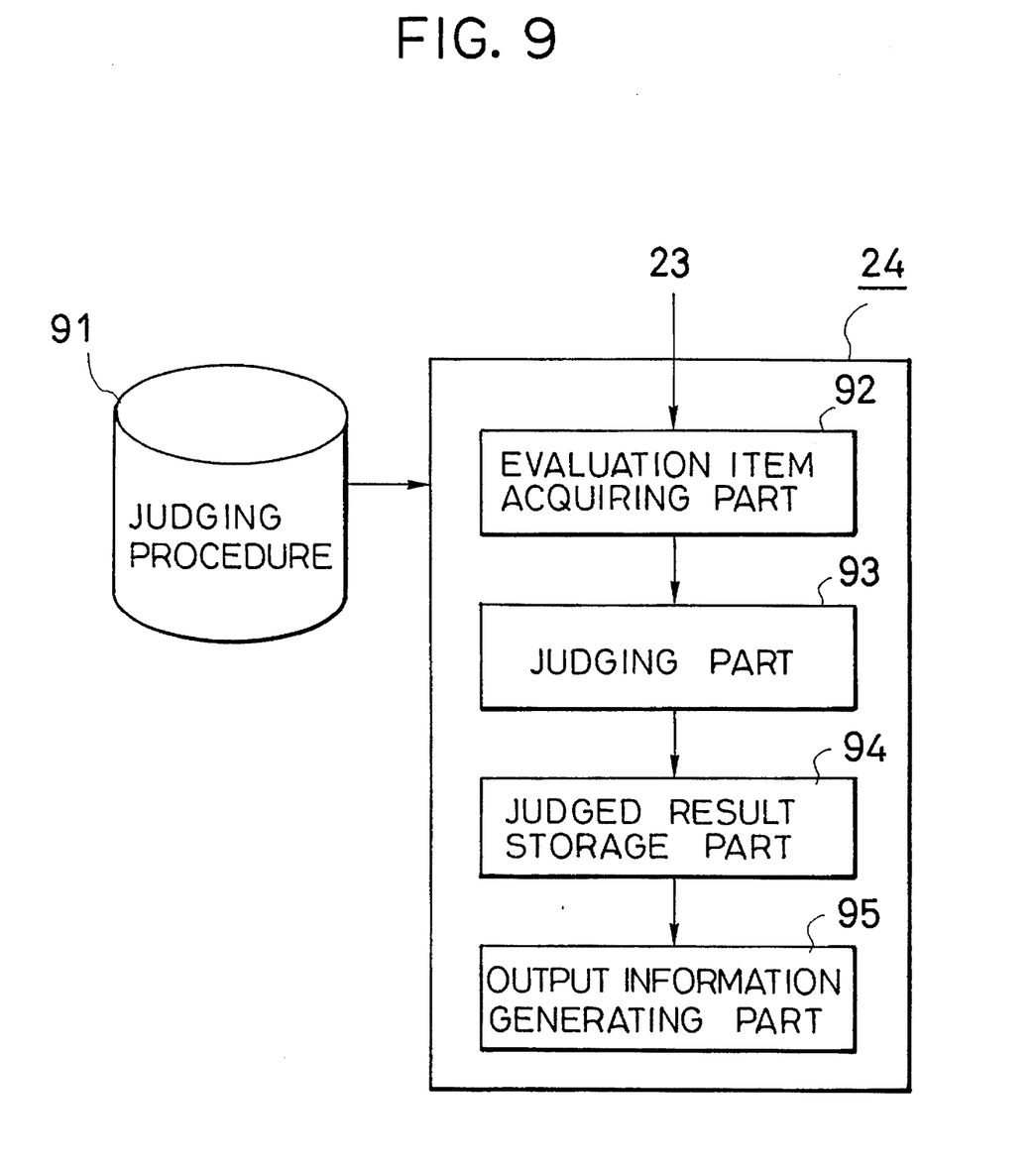
FIG. 9 is a diagram showing a construction of an information indication part 24 and one example of judging procedures.

FIG. 9 illustrates a construction of the information indication part 24. The information indication part 24 is constructed of: a judging procedure storage part 91 for storing the procedures for determining the evaluation order, the procedures for judging the evaluated results and the output information selection procedures for determining the process to be executed next on the basis of the judged results and the information to be acquired; an evaluation item acquiring part 92 for reading the evaluated results of the rule evaluation part 23 in accordance with the determining procedures of the evaluation order; a judging part 93 for judging the evaluation items read in accordance with the judging procedures of the evaluated results; a judged result storage part 94 for storing the judged results in a table format; and an output information generating part 95 for determining the information to be outputted based on the judged result output information selection procedures accumulated in the judged result storage part 94. A table D shows one example of the judging procedures stored in the judging procedure storage part 91.

TABLE D

| | Evaluation order is: |
|---|---|
| 961 | item number → deficient case acquisition → deficient item acquisition |
| 962 | Item having a greater using number is important |
| 963 | Priority is given to the item having a greater deficient value |
| 964 | If the condition number is large, the cases are deficient |
| 965 | If the conclusion number is large, the items are deficient |

Figure 10:
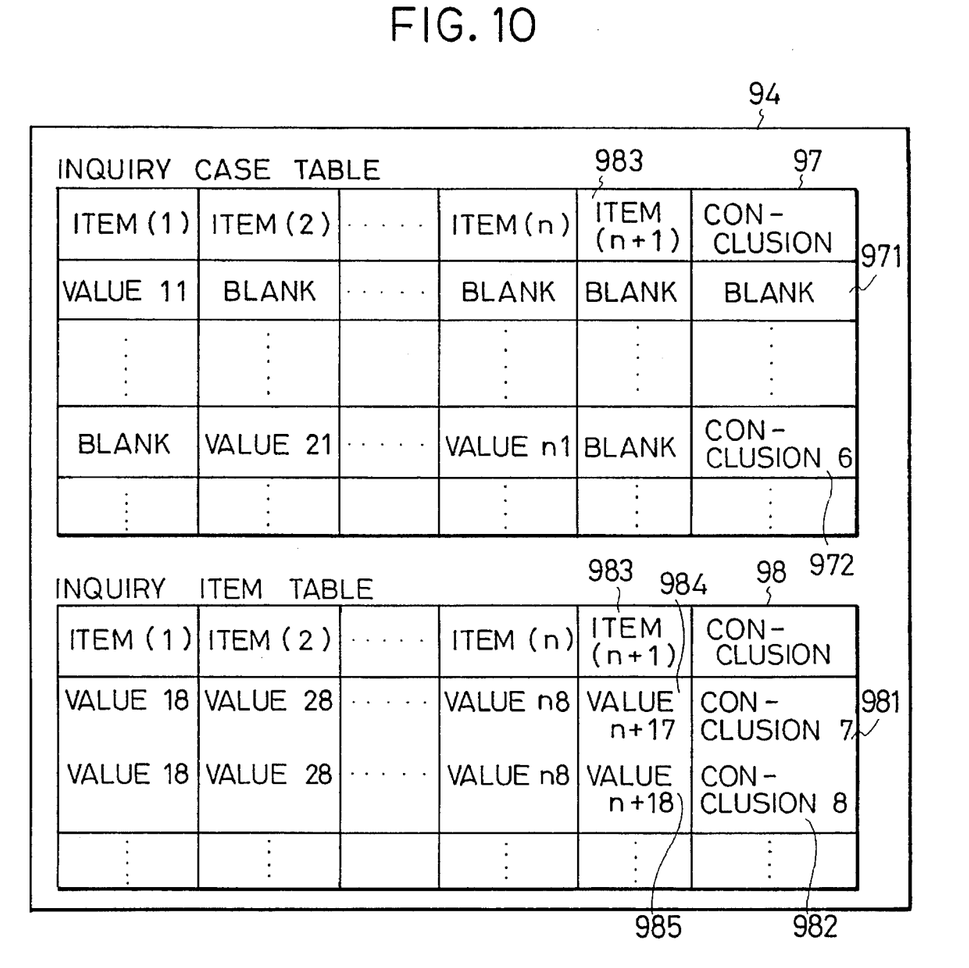
FIG. 10 is a chart illustrating a construction of a judged result storage part 94.

FIG. 10 shows a constructive example of the judged result storage part 94. The judged result storage part 94 is composed of an inquiry case table 97 for storing the cases to be inquired and a inquiry item table 98 for storing the cases used when inquiring about the deficient items.

Figure 11:
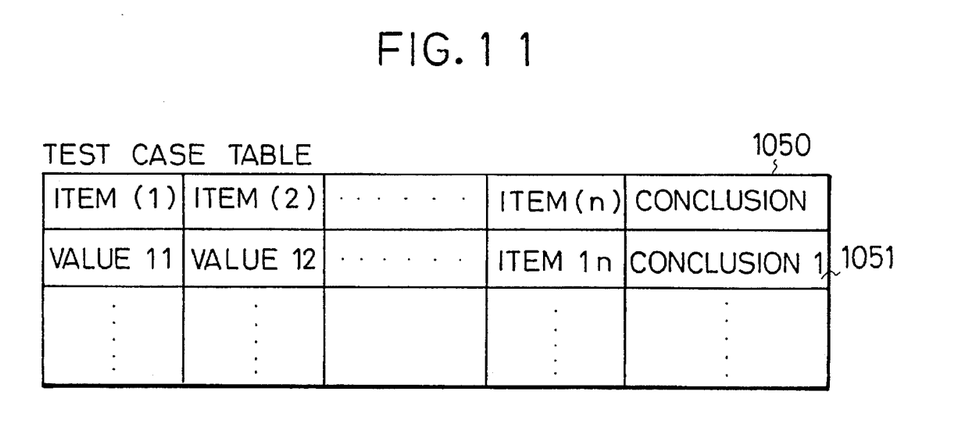
FIG. 11 is a chart showing an example of a test case table.

FIG. 11 illustrates one example of a test case table employed for explaining the flow of this embodiment and that is stored in the test data base 5. Stored in the test case table are the cases inputted from the keyboard 14 or the cases selected by a certain designated constant number at random from the case base 1.

Figures 12, 12A:
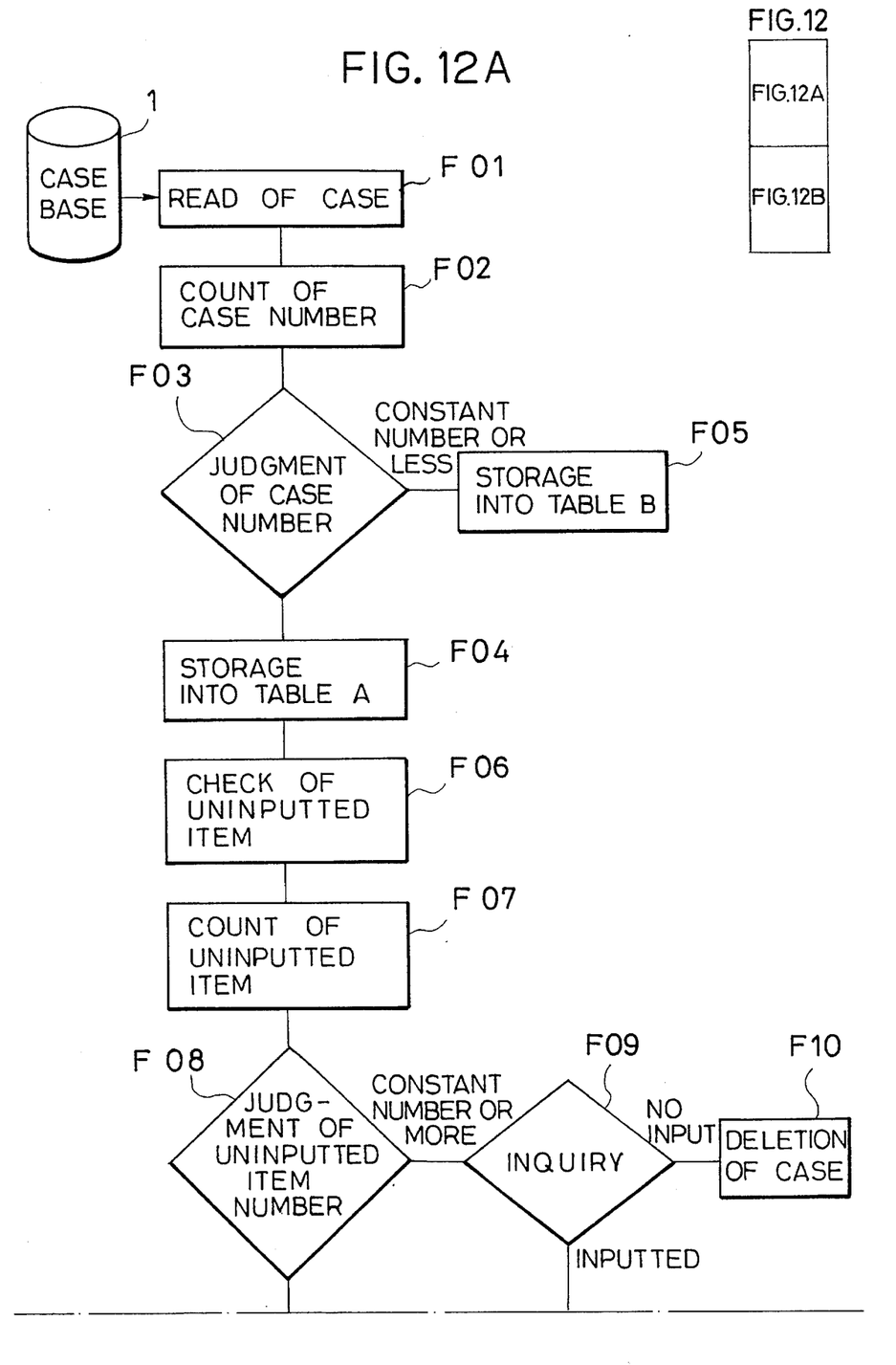
FIG. 12 illustrates the interrelation of flowchart portions illustrated in FIGS. 12A and 12B.
FIG. 12A illustrates a top portion, as shown in FIG. 12, of the flowchart according to an embodiment of the invention.
Figure 12B:
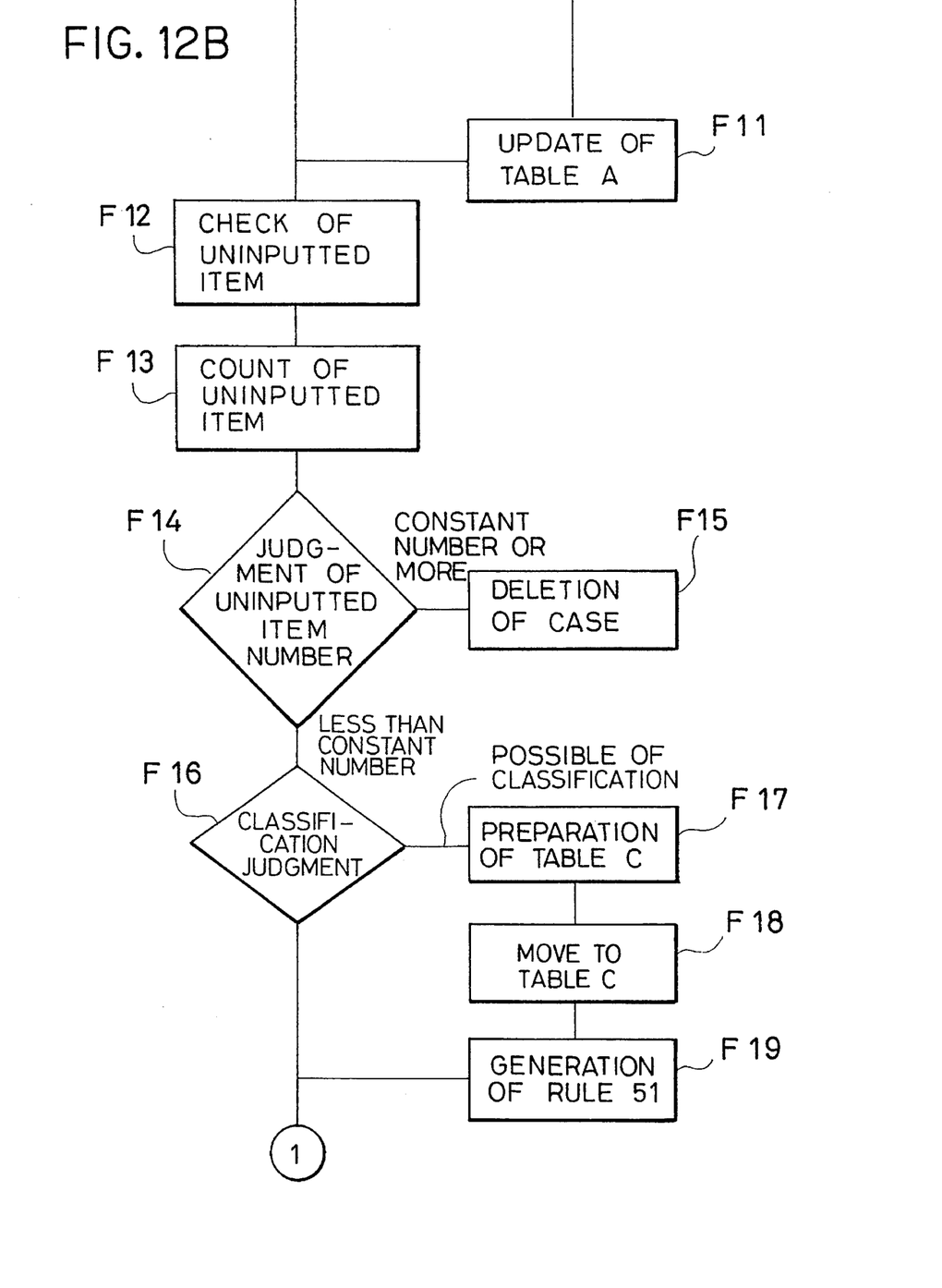
FIG. 12B illustrates a bottom portion, as shown in FIG. 12, of the flowchart according to an embodiment of the invention.
Figure 13:
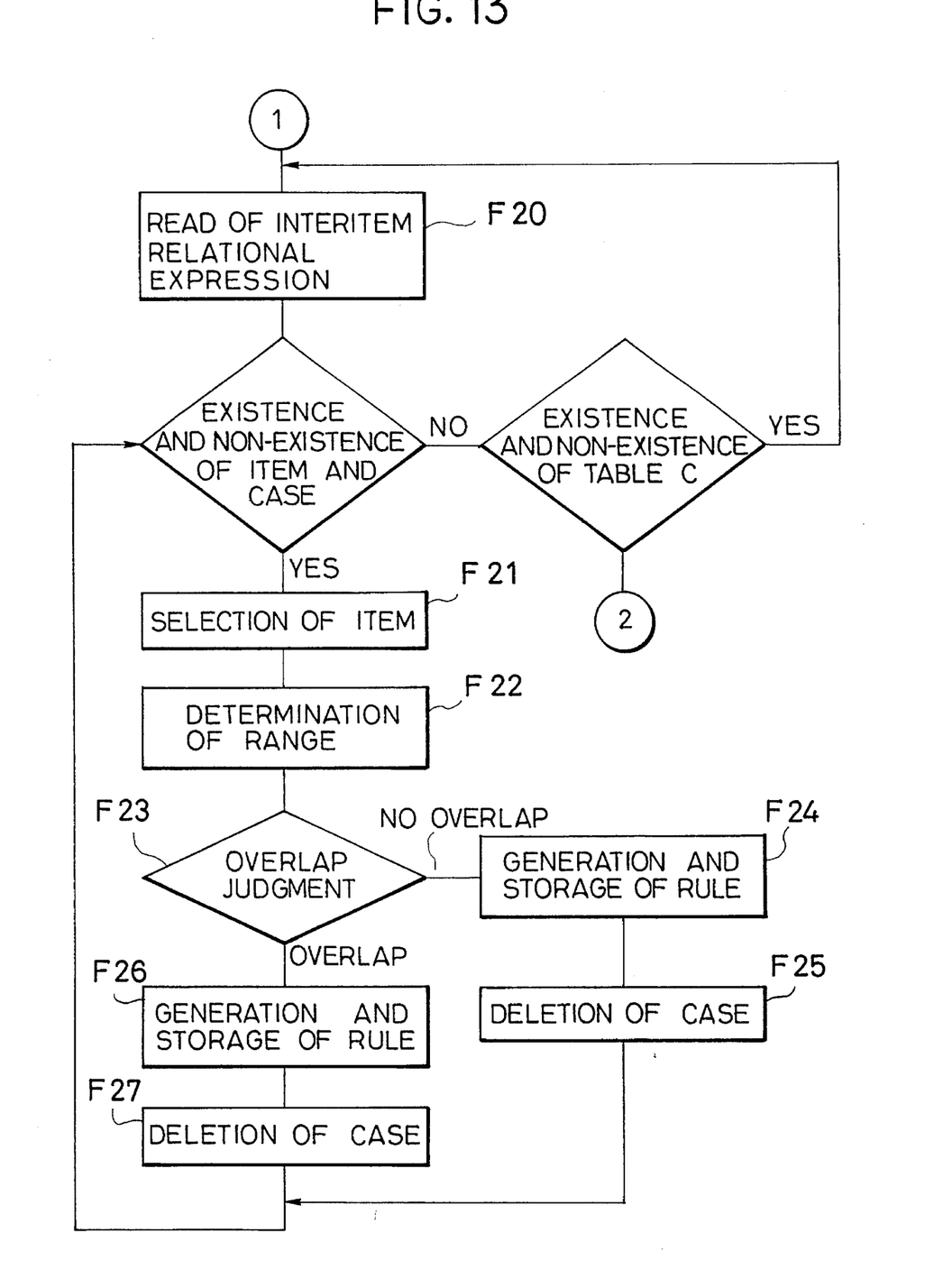
FIG. 13 is a flowchart continued from FIG. 12.
Figure 14:
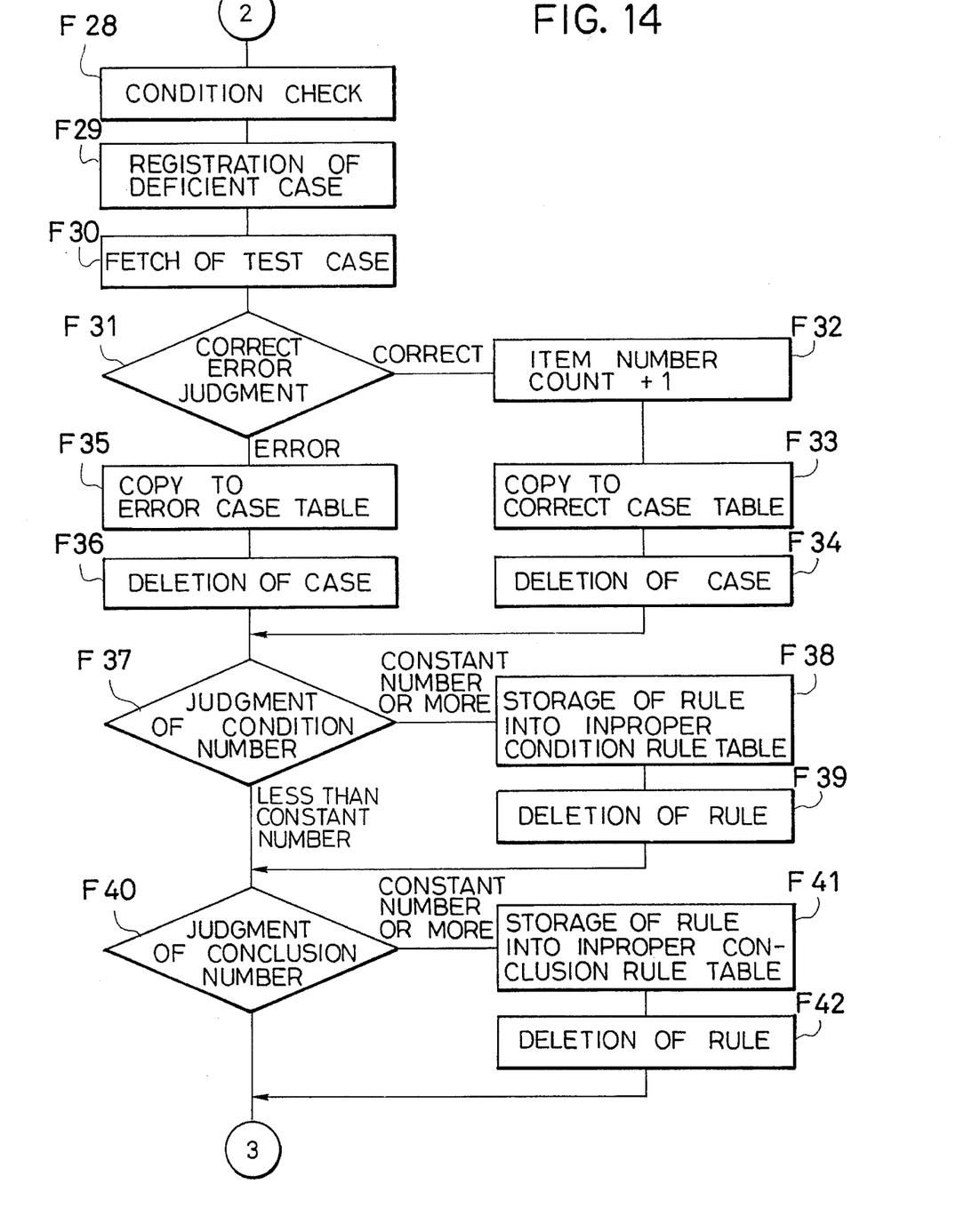
FIG. 14 is a flowchart continued from FIG. 13.
Figure 15:
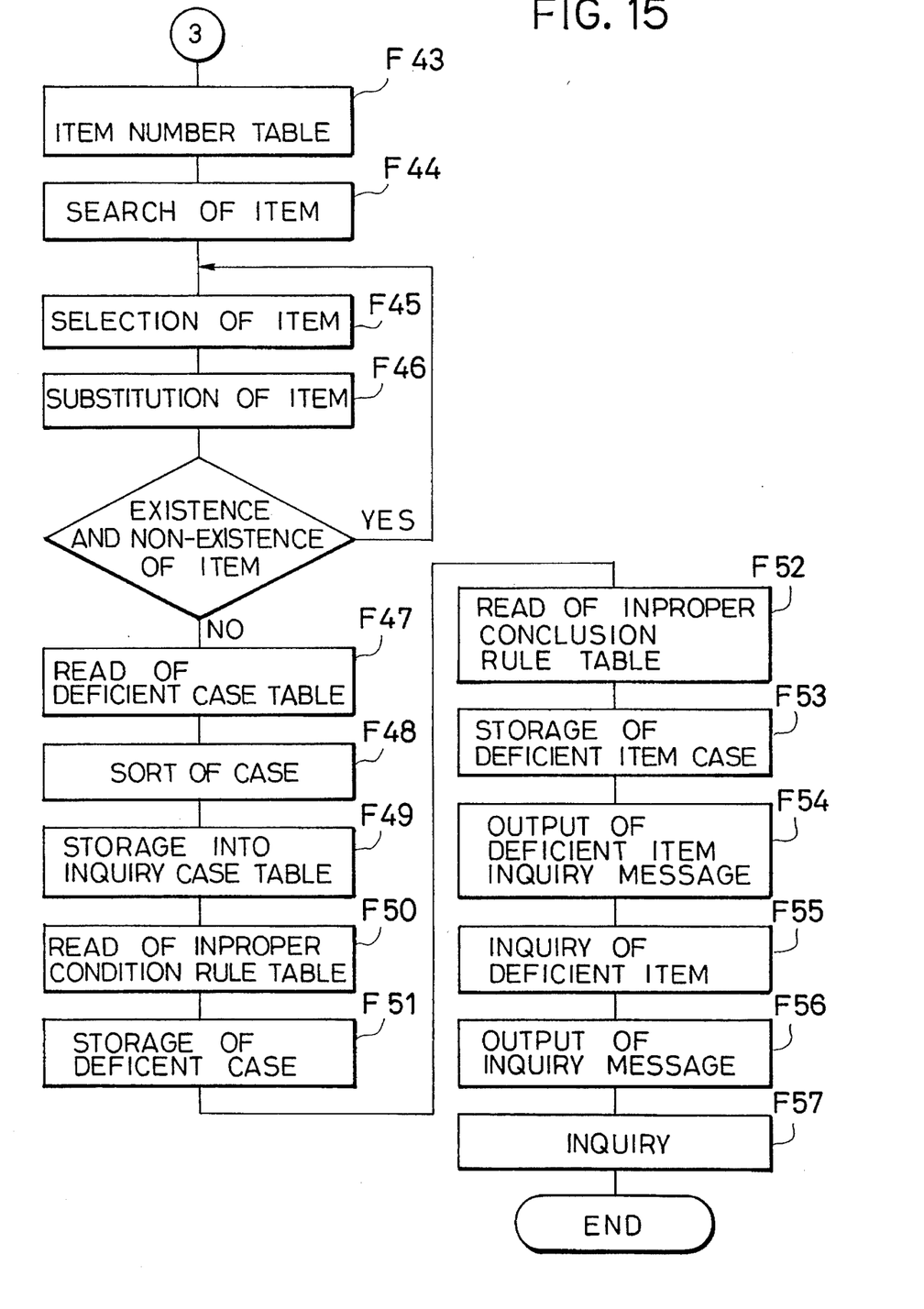
FIG. 15 is a flowchart continued from FIG. 14.

FIGS. 12 through 15 are flowcharts each showing a flow of the procedures for this embodiment which are executed by the CPU 11 in accordance with programs stored in the memory 12. FIG. 12 shows the processing procedures of the case preprocessing part 21. FIG. 13 shows the processing procedures of the rule generation part 22. FIG. 14 shows the processing procedures of the rule evaluation part 23. FIG. 15 shows the processing procedures of the information indication part 24.

The operation of the embodiment will hereinafter be described with reference to FIGS. 11 through 15.

The case preprocessing part 21 reads the cases from the case base 1 stored in the outside storage unit 13 or entered in from the keyboards 14 (F01 of FIG. 12). The case preprocessing part 21 counts the number of cases having the same conclusion according to the conclusion 32 (F02) and stores the cases in the work table 71 according to the conclusion. The case preprocessing part 21 subsequently judges whether the conclusion has a greater or smaller number of cases than a value previously held by the system or an inputted value (F03). The case of the conclusion having a larger number of cases than a certain constant number is copied from the work table 71 to the table A 73 (F04). The case of the conclusion having a smaller number of cases than it is copied from the work table 71 to the table B 74 (F05). The case preprocessing part 21 further checks whether the items 311, 312, . . . , 313 of the respective cases 33, 34, . . . stored in the table A 73 have values or not (F06). The case preprocessing part 21 counts the number of the items 352 having no value for each of the cases 33, 34, . . . (F07). Judged is whether or not the case is one in which the number of the items 352 having no value is greater than a certain constant value previously held by the system or a certain constant value inputted.

The case preprocessing part 21 subsequently displays, on the display 15, the cases in which the number of the items 352 having no value is greater than a certain constant value. The case preprocessing part 21 inquires about an item 352 having no value (F09). In this case, the attention of the operator may be alerted by flash-displaying the item 352 having no value. The inquiry herein implies that the case having the item 352 with no value is displayed on the display 15, and the attention of the operator is alerted to input the value to the item having no value. As a result of the inquiry, there may be no input of the item having no value from the keyboard within a predetermined time, or alternatively there may be an input indicating that the input of the item having no value is not effected. In this instance, that case is deleted from the table A 73 (F10). If there is a value input for the item having no value from the keyboard within the predetermined time, the inputted value is written to a relevant portion of the table A 78 (F11). Checked again is whether or not the items 311, 312, . . . , 313 have the values (or are blank) with respect to the cases where the inquiry has been initiated (F12). The number of the items 352 having no value is counted for every case (F13). Judged is whether or not the number of the items 352 having no value is more than a certain constant value previously held by the system or a certain value inputted (F14). As a consequence of the judgment, the case where the number of the items 352 having no value is more than the certain constant value is deleted from the table A 73 (F15).

Next, only when a certain item 312 is the item 352 having no value, the conclusion 32 takes a value 354; and only when a certain item 312 takes some values 332, 342, . . . , the conclusion 32 takes a value other than the value 354, thereby judging whether it is classifiable or unclassifiable (F16). If classifiable, a table C 75 is newly prepared (F17). Next, for the case where the item 312 is the item 352 having no value, the case is shifted from the table A 73 to the table C 75 (F18). Generated subsequently is a rule 51 of [If the item 312 is the item having no value, the rule generated by the rule generation part 22 is executed by use of the table C]. The rule 51 is stored in the rule base 23 (F19). These processes (F16–F19) are repeated with respect to all the items 311, 312, . . . , 313 of the item 31.

Next, the processes executed by the rule generation part 22 will be explained. To start with, the rule generation part 22 reads inter-item relations shown in FIG. 4 from the relational expression base 4 (F20 of FIG. 13) and effects a rule generating process for the cases stored in the table A. In the rule generating process, a rule group name 605 for indicating the rules generated from the table A is at first written to the rule base 3. Next, the most important item 41 among the items read is selected (F21). Determined are values 331, 341 of the item 311 for deriving such a value 334 as to become the same conclusion with respect to the values 331, 341, . . . of the item 311 in the table A 73 which is equal to a item 41 (F22). Checked is whether or not the case exists in the table A73, wherein a value of the conclusion 32 when values of the item 311 are the values 331, 341 is different from the value 334 (F23). If such a case does not exist, the fact that the conclusion 32 when the item 311 has the value 331 or 341 takes the value 334 is generated as a rule 66 shown in FIG. 6 (F24). This rule is stored in the rule base 3, whereas the relevant cases 33, 34 are deleted (F25).

Generated as a rule 67 shown in FIG. 6 is the fact that the case is one where the item 311 has the value 341; there is a case 36 where the conclusion 32 thereof has a value 364 different from the value 334; and the conclusion 32 when the item 311 has the value 331 takes a value 334 (F26). This rule is stored in the rule base 3, whereas the case 33 is deleted from the table A 73 (F27). In regard to the cases 34 and 36, whether the conclusion 32 has the value 334 or 364 can not be determined simply from the fact that the item 311 has the value 341. Hence, the same process is effected with respect to the values 332, 342, . . . of the item 312 in the table A 73 which is equal to the item 42 important next to the item 41. Generated as a rule 68 shown in FIG. 6 is the fact that the conclusion 32 when the item 312 has the value 342 takes a value 334. This rule is stored in the rule base 3. Generated as a rule 69 shown in FIG. 6 is the fact that the item 312 has a value 362 takes a value 364. This rule is stored in the rule base 3, whereas the relevant cases 34, 36 are deleted.

The same processes are performed till the cases of the table A 73 can not be classified with respect to the item 41. If unclassifiable, the rule generation similarly continues till the cases of the table A disappear with respect to the second most important item 42 in the relations (F20–F27). The rule generation relative to all the cases stored in the table A 73 is finished, and further if the table C 75 exists, a rule group name 606 for indicating the rule generated from the cases contained in the table C 75 is written to the rule base. The rule generation is similarly performed with respect to the cases stored in the table C 75 (F20–F27).

After finishing the rule generation by the rule generation part 22, the rule evaluation part 23 judges whether or not there are deficient values in values 674, 603 of an item 673 of conditions 671, 601 (if the item 673 may take the values 674, 603, 604, the value 604 is a deficient value) with respect to the generated rules 67, 60 by searching the contents of the tables A 73, C 75 (F28 of FIG. 14). If there is the deficient value 604, that item 673 and the deficient value 604 are registered in a deficient case table 82 in the evaluated result table 81 (F29). These processes (F28–F29) are executed with respect to the items of the condition parts of all the generated rules.

Next, a case 1051 is taken out of a test case table 1050 (F30). Judged is whether or not the case 1051 can be correctly classified by the rules 67, 60 (F31). If correctly classified, 1 is added to a using number 831 of the item (1) of an item number table 83 in the evaluated result table 81 which corresponds to the same item as an item 673 of a condition 671 of the rule 67 used for correctly classifying the case (F32). The case concerned is copied to a correct case table 84 in the evaluated result table 81 (F33). The relevant case 1050 is deleted from the test case table 1050 (F34). Whereas if not correctly classified, the relevant case is copied to an error case table 85 (F35). The relevant case 1050 is deleted from the test case table 1050 (F36). These processes (F30–F36) are executed for all the cases of the test case table 1050.

Judged next for each of the nos. 67, 60 is whether or not the number of conditions (the number of conditions of the rule 66 in FIG. 6 is two, i.e., the conditions 61 and 62) of the rule condition parts 671, 601 exceeds a previously inputted reference value (F37). If the number of conditions exceeds the reference value, the rules are stored in the improper condition rule table 86 of the evaluated result table 81 (F38). The relevant rules are deleted from the rule base 3 (F39). Judged next for each of the rules 67, 60 is whether or not the number of conclusions of rule conclusion parts 672, 602 exceeds a previously inputted reference value (typically set to 1 because of depending on the judgment if there are several conclusions under the same condition) (F40). If the number of conclusions exceeds the reference value, the rules are stored in the improper conclusion rule table 87 of the evaluated result table 81 (F41). The relevant rules are deleted from the rule base 3 (F42).

The information indication part 24 is constructed as shown in FIG. 9. The information indication part 24 at first reads contents of the relevant item number table 83 in accordance with a procedure 961 stored in the judging procedure storage part 91 by the evaluation item acquiring part 92 in the construction illustrated in FIG. 9 (F43 of FIG. 15). The judging part 93 selects the item 313 whose relation is not clarified in the relational expressions shown in FIG. 4 from the items 311, 312, . . . in accordance with a judging procedure 962 stored in the judging procedure storage part 91 (F45). The item having the maximum using number of the item number table 83 among them is selected. This item enters the box 44 marked with "?" and positioned leftmost in the relational expressions shown in FIG. 4.

These processes (F45–F46) are repeated till the item 313 whose relation is not clarified disappears.

The information indication part 24 next reads contents of the deficient case table 82 in accordance with the procedure 961 stored in the judging procedure storage part 91 (F47). The judging part 93 rearranges the cases in the order according to a magnitude in the number of items 821 having a larger number of deficient values in accordance with the procedure 963 stored in the judging procedure storage part 91 (F48). The rearranged result is stored in the inquiry case table 97 of the judged result storage part 94 (F49). Next, the contents of the improper condition rule table 86 are read according to the procedure 961 stored in the judging procedure storage part 91 (F50). The judging part 93 stores a case 872, satisfying the improper condition rule, in which a value of the item that does not exist in the condition part is blank into the inquiry case table 97 of the judged result storage part 94 in accordance with the judging procedure 964 stored in the judging procedure storage part 91 (F51).

The information indication part 24 next reads the contents of the improper conclusion rule table 87 in accordance with the procedure 961 stored in the judging procedure storage part 91 (F52). The judging part 93 stores cases 981, 982 satisfying the condition part and each taking a value of conclusion into the inquiry item table 98 of the judged result storage part 94 in accordance with the judging procedure 965 stored in the judging procedure storage part 91 (F53). Next, the output information generating part 95 outputs a deficient item inquiry message (F54). A plurality of cases 981, 982 are indicated on the display, and an inquiry is made to input the item 983 for distinguishing the two cases 981, 982 and values 984, 985 thereof (F55). On inputting these values from the keyboard 14, the inputted item 983 is added to the inquiry item table; and the values 983, 984 are substituted into the relevant items of the item 983.

Next, the cases of the table B 74 are copied to the inquiry case table 97. The item 983 added by the deficient item inquiry is added to the inquiry case table, and a deficient case inquiry message is indicated on the display 15 (F56). The cases 971, . . . , 972, . . . stored in the inquiry case table 97 are sequentially displayed, and an inquiry is made to input a value to the blank (F57). The values inputted from the keyboard 14 are substituted into the relevant items of the inquiry case table 97. The inquiry case table 97 is stored in the case base 1 and employed for the next rule generation.

As discussed above, in accordance with this embodiment, the cases used for the rule generation are processed beforehand on the basis of a certain fixed evaluation criterion. The rules are generated by use of the relations between the attributes constituting cases. Further, the inquiry of the case to be acquired next is made according to the predetermined procedures, and the inter-item relations are displayed. The construction of the knowledge base of the expert system is thereby facilitated.

Although the illustrative embodiment of the present invention has been described in detail with reference to the accompanying drawings, it is to be understood that the present invention is not limited to this embodiment. Various changes or modifications may be effected by one skilled in the art without departing from the scope or spirit of the invention.

What is claimed is:

1. A knowledge acquisition support system in an expert system, comprising:
    a case data storage means for storing data of cases including a set of plural pieces of data items and conclusions;
    a relational expression storage means connected to said case data storage means for storing relational expressions prescribing relations of said plural pieces of data items;
    a case preprocessing part for analyzing said data of cases stored in said case data storage means for performing one of deleting data of ones of said cases which do not satisfy a predetermined evaluation criterion and changing said data of said ones of said cases to satisfy the criterion including storing said changed data in said case data storage means;

a rule generation part for generating rules by determining from said data of cases whether predetermined relations exist between at least one predetermined one of the data items and a predetermined one of the conclusions and classifying said predetermined relations of said cases preprocessed by said case preprocessing part with reference to said relational expressions stored in said relational expression storage means;

a rule storage means for storing said rules generated by said rule generation part;

a test data storage means for storing data of tests used for evaluating said rules generated by said rule generation part;

a rule evaluation part connected to said test data storage means and said rule storage means for evaluating said rules generated by said rule generation part by use of said test data stored in said test data storage means; and an information indication part for indicating evaluated results of said rule evaluation part.

2. A knowledge acquisition method in an expert system, comprising the steps of:

storing cases including a set of plural pieces of data items;

storing relational expressions prescribing relations of said plural pieces of data items;

analyzing said data of cases stored for performing one of deleting data of ones of said cases which do not satisfy a predetermined evaluation criterion and changing said data of said ones of said cases to satisfy the criterion including storing said changed data;

generating rules by determining from said data of cases whether predetermined relations exist between at least one predetermined one of the items and a predetermined one of the conclusions and classifying said predetermined relations of said cases in accordance with previously inputted criteria relating said data items of said cases;

storing a procedure for determining an evaluation order of said generated rules, a procedure for judging evaluated results and a procedure for determining a process to be executed next and information to be acquired;

evaluating said generated rules in accordance with said evaluation order determined by said determining procedure;

judging the evaluated results in said judging procedure; and indicating said process to be executed next and said information to be acquired in accordance with the judged results and said procedure for determining said process to be executed next and said information to be acquired.

3. A knowledge acquisition support system in an expert system according to claim 1, wherein said relational expression storage means stores an expression indicating an order of a magnitude of significance among the data items as one of said relational expressions.

* * * * *